United States Patent
Yasuda et al.

(10) Patent No.: US 7,154,645 B2
(45) Date of Patent: Dec. 26, 2006

(54) HOLOGRAPHIC RECORDING METHOD AND APPARATUS

(75) Inventors: Shin Yasuda, Ashigarakami-gun (JP); Katsunori Kawano, Ashigarakami-gun (JP); Jiro Minabe, Ashigarakami-gun (JP); Tatsuya Maruyama, Minato-ku (JP); Norie Matsui, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 10/796,033

(22) Filed: Mar. 10, 2004

(65) Prior Publication Data
US 2005/0018262 A1    Jan. 27, 2005

(30) Foreign Application Priority Data
Jul. 23, 2003   (JP)   ............... 2003-278108

(51) Int. Cl.
    *G03H 1/12*    (2006.01)
(52) U.S. Cl. .............. 359/11; 359/22; 359/30
(58) Field of Classification Search ........... 359/11, 359/7, 10, 18, 22, 29, 30
See application file for complete search history.

(56) References Cited

U.S. PATENT DOCUMENTS

| | | | |
|---|---|---|---|
| 6,721,076 B1* | 4/2004 | King et al. | ............... 359/35 |
| 2001/0002895 A1* | 6/2001 | Kawano et al. | ............ 369/103 |
| 2004/0027629 A1* | 2/2004 | Wilson et al. | ................ 359/11 |

FOREIGN PATENT DOCUMENTS

JP    A 10-340479    12/1998

* cited by examiner

*Primary Examiner*—Fayez G. Assaf
(74) *Attorney, Agent, or Firm*—Oliff & Berridge, PLC

(57) ABSTRACT

A holographic recording method and a holographic recording apparatus capable of selectively rewriting or erasing only desired data without degrading data other than the desired data are provided. Holograms are multiple recorded per file, and page data in one file is multiple recorded, while page data in one file and page data in another file are not multiple recorded. Therefore, only the desired file can be selectively rewritten or erased without degrading the other files.

22 Claims, 12 Drawing Sheets

SIGNAL LIGHT

SPHERICAL REFERENCE LIGHT

VOLUME MULTIPLE RECORDING
IS POSSIBLE BY ROTATING DISK

HOLOGRAPHIC RECORDING METHOD AND APPARATUS

CROSS-REFERENCE TO RELATED APPLICATION

This application claims priority under 35 USC 119 from Japanese Patent Application No. 2003-278108, the disclosure of which is incorporated by reference herein.

BACKGROUND OF THE INVENTION

1. Field of the Invention

The present invention relates to a holographic recording method and a holographic recording apparatus. More specifically, the invention relates to a holographic recording method and a holographic recording apparatus for multiple recording data on a rewritable recording medium as a hologram.

2. Description of the Related Art

Attention has been paid, as a next-generation computer file memory, a holographic memory that exhibits mass storage characteristics resulting from a three-dimensional recording area and high-speed characteristics resulting from a two-dimensional batch recording and reproducing. The holographic memory can record plural data pages in the same volume by multiplexing the pages, and can batch-read the data of each page. The holographic memory provides not analog images but binary digital data "0 and 1" as digitized "brightness and darkness", and records and reproduces the data, and whereby the holographic memory can record and reproduce the digital data. Recently, there have been proposals of an S/N or bit error rate evaluation or two-dimensional coding based on a concrete optical system or a volume multiplexed recording method for this digital holographic memory system, and the study of a digital holographic memory system is proceeding from more optical-based viewpoints, such as the influence of an aberration of the optical system.

FIG. 11 is an illustration for describing an angular multiplexing method that is one of volume multiplexing methods. With this angular multiplexing method, a digital data page (signal light) 2 is condensed by a lens 4, and irradiated onto a volume of a holographic recording medium 6. Reference light is simultaneously irradiated onto the same volume of the holographic recording medium 6 as that irradiated by the signal light. In performing multiple recording, the signal light is recorded while changing an incident angle of the reference light. In performing data reading (reproducing), a target hologram is accessed by addressing the hologram based on the reference light used for recording, and whereby the data page (signal light) can be reproduced.

FIGS. 12A and 12B are illustrations for describing a shift multiplexing method. With this method, a light wave having a rapidly changing wave front such as a spherical wave or a speckle pattern is used as the reference light. If such a reference light is used, Bragg condition for reproduction can be avoided only by slightly shifting a position of a recording medium from a recording spot by a shift amount δ (see FIG. 12B), and a new hologram can be recorded at the shifted position. Namely, this method enables multiple recording of holograms in substantially the same volume by recording data while slightly shifting the recording medium.

Thus, digital holographic storage can simultaneously realize high-speed transfer resulting from the two-dimensional batch recording and reproducing, and mass storage capacity resulting from volume recording.

As materials for the media of the holographic memory, a photopolymer material, a photorefractive material, an azopolymer material, and the like are studied extensively. The recording medium composed of the photorefractive material or the azopolymer material among these materials can erase recorded data and record new data. Since such a rewritable recording medium can record data repeatedly, it is much expected to be used as a backup memory for a hard disk or the like besides its mass storage capacity of information.

Conventionally, if data is to be erased from the rewritable recording medium, it is the most common method to erase the data by uniformly irradiating light onto whole recording areas and thereby destroying all of recorded holograms. Further, if the recording medium composed of the photorefractive material or the azopolymer material is heated and a temperature of the medium is kept high, holograms can be batch-erased (see Appl. Phys. Lett. 60, 4–5 (1992)).

Nevertheless, the conventional multiple recording methods have the following disadvantages. If one file is to be rewritten or erased, the holograms corresponding to the other files that are not necessary to be rewritten or erased are partially destroyed. This is because the files are multiple-recorded irrespective of the difference of the files even when holograms corresponding to plural files are to be recorded. If the holograms are partially destroyed, diffraction efficiencies of the holograms are deteriorated, thereby degrading the recorded data.

SUMMARY OF THE INVENTION

The present invention has been made in view of the above circumstances and provides a holographic recording method and a holographic recording apparatus capable of selectively rewriting or erasing only desired data without degrading the other data.

According to a first aspect of the present invention, there is provided a holographic recording method including, simultaneously irradiating a signal light beam and a reference light beam onto an optical recording medium, and changing a recording angle while changing an angle formed between the signal light and the reference light beam, and thereby recording information of the signal light beam in the optical recording medium as plural pages of holograms. Here, page data is multiple-recorded for each predetermined unit.

According to a second aspect of the invention, there is provided a holographic recording method including, simultaneously irradiating a signal light beam and a reference light beam onto an optical recording medium while an angle formed between the signal light beam and the reference light beam is set constant, and changing a recording position while relatively shifting at least one of (A) the signal light beam and reference light beam and (B) the optical recording medium, and thereby recording information of the signal light beam in the optical recording medium as plural pages of holograms. Here, page data is multiple-recorded for each predetermined unit.

According to a third aspect of the invention, there is provided a holographic recording method including, simultaneously irradiating a signal light beam and a reference light beam onto an optical recording medium while changing a wavelength of the signal light beam and a wavelength of the reference light beam, with an angle formed between the signal light beam and the reference light beam being set constant, and recording information of the signal light beam in the optical recording medium as plural pages of holograms. Here, page data is multiple-recorded for each predetermined unit.

According to a fourth aspect of the invention, there is provided a holographic recording method including, simultaneously irradiating a signal light beam and a reference light beam onto an optical recording medium while changing a phase of the reference light beam, with an angle formed between the signal light beam and the reference light beam being set constant, and recording information of the signal light beam in the optical recording medium as plural pages of holograms. Here, page data is multiple-recorded for each predetermined unit.

With the holographic recording method in the first to fourth aspects, the page data is multiple-recorded per predetermined unit. Therefore, only desired data can be selectively rewritten or erased without degrading the other data. The page data in the predetermined unit is, for example, page data that constitutes one file. If the page data included in the one file is divided to plural blocks and the plural blocks are recorded, the page data in the predetermined unit is page data that constitutes one block of the plural blocks.

In each aspect, a polarization direction of the signal light beam is set parallel to a polarization direction of the reference light beam, whereby an intensity distribution of an interference light can be recorded as a hologram. Alternatively, the polarization direction of the signal light beam can be set different from the polarization direction of the reference light beam. For example, by setting the polarization direction of the signal light beam orthogonal to the polarization direction of the reference light beam, a polarization distribution of a synthesized wave can be recorded as a hologram.

In each aspect, if information is recorded per file, it is preferable to record, in the optical recording medium, information (e.g., FAT) that makes the file correspond to a recording area in which the file is recorded. By referring to this information, a recording area usage can be grasped. It is also preferable to add page data that represents head information to a front page of the file. The head information includes information for specifying the recording area on the recording medium, in which the page data in the file is present. During reproduction, by referring to the FAT and this information, the page data in the desired file can be found. It is further preferable to add page data that represents information on a recording area, in which the block to be read next is recorded, to an end of each block if the file is divided to plural blocks and the plural blocks are recorded. By adding such information, it is possible to reduce occurrence of an error through detection thereof, although the respective blocks may be read in a predetermined order by referring to the FAT and the head information.

In each aspect, if the file is divided to plural blocks and the plural blocks are recorded, it is preferable that the file is reallocated, i.e., so-called defragmentation is executed so that the file is re-divided to a smaller number of blocks. By executing the defragmentation and eliminating the fragmentation, it is possible to prevent a decrease in a file search speed.

As the optical recording medium, the optical recording medium including a photorefractive material, or the optical recording medium including a polarization sensitive material can be used. It is preferable that the polarization sensitive material includes at least one type of polymer selected from polyesters, and that the at least one type of polymer includes an azobenzene structure in a side chain.

According to a fifth aspect of the invention, there is provided a holographic recording apparatus for recording information of a signal light beam in an optical recording medium as plural pages of holograms while using the holographic recording method stated above. For example, the holographic recording apparatus, to which a shift multiplexing method is applied, can be constituted to include: a light source for emitting a coherent light beam; a stage that rotates or shifts an optical recording medium; a light dividing and optical path changing unit that divides the coherent light beam to a light beam for a reference light beam and a light beam for a signal light beam, and thereafter that changes an optical path so that the reference light beam and the signal light beam are simultaneously irradiated onto the optical recording medium; a spatial light modulator that is arranged in the optical path of the light beam for the signal light beam, that modulates the light beam for the signal light beam in accordance with a supplied recording signal for each page, and that generates the signal light beam for recording the each page of a hologram; and a signal supply unit that supplies the recording signal for the each page to the spatial light modulator so that page data is multiple-recorded for each predetermined unit.

This holographic recording apparatus can further include an analyzer that transmits a component, in a predetermined polarization direction, of a diffracted light beam from the each page of the hologram recorded in the optical recording medium, and a detector that detects intensities of transmitted light beams that are transmitted through the analyzer. By thus providing the analyzer, it is possible to select and reproduce a necessary component.

As described above, the present invention can exhibit an advantage in that only the desired data can be selectively rewritten or erased without degrading the other data.

BRIEF DESCRIPTION OF THE DRAWINGS

Preferred embodiment of the present invention will be described in detail based on the following figures, wherein.

DETAILED DESCRIPTION OF THE INVENTION

A holographic recording and reproducing apparatus in one embodiment of the present invention will be described hereinafter in detail with reference to the drawings. The holographic recording and reproducing apparatus in the embodiment is based on application of a holographic recording method of the present invention to a shift multiplexing method.

Figure 1:
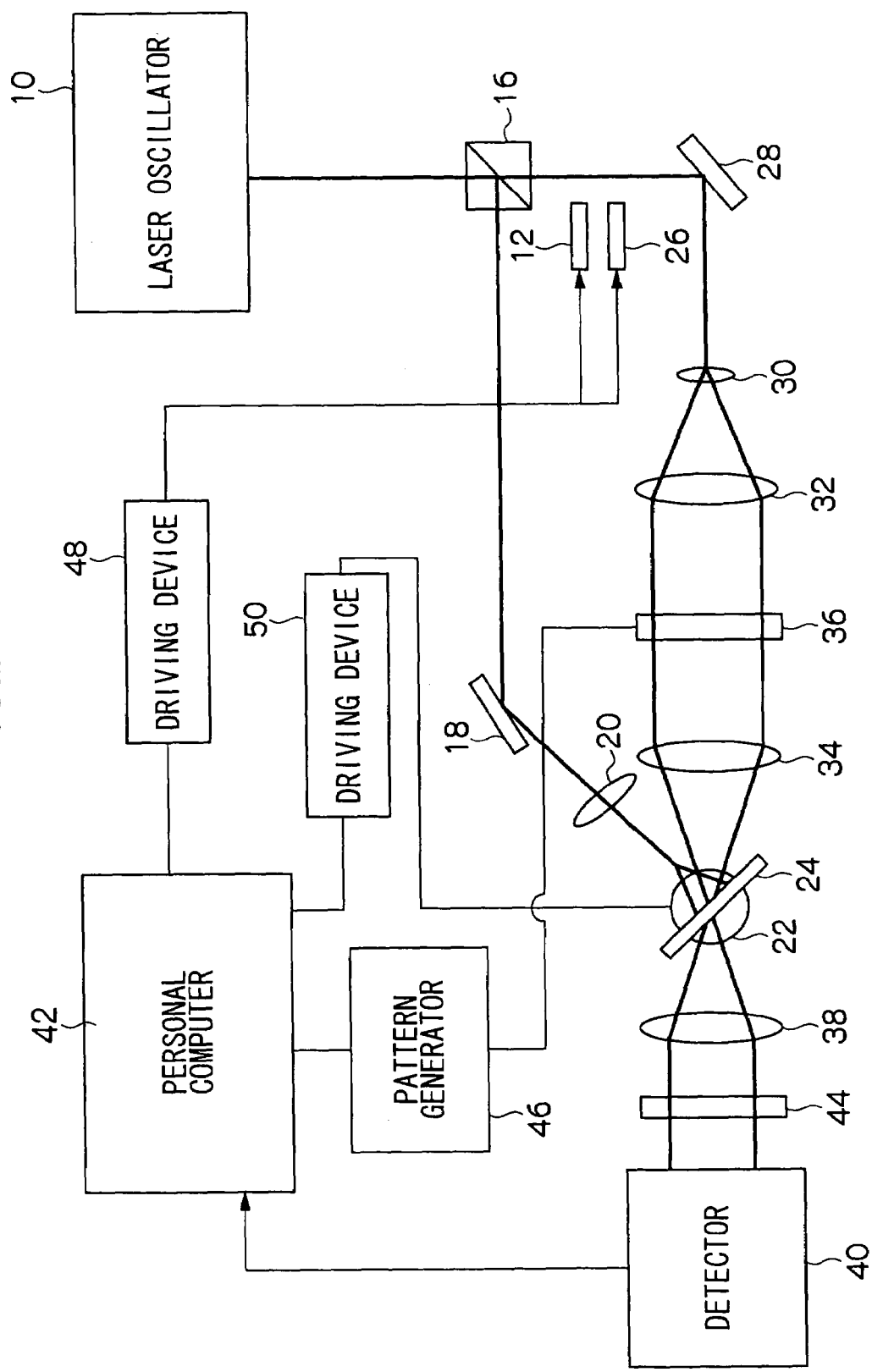
FIG. 1 is a schematic view of a holographic recording and reproduction apparatus in an embodiment of the present invention.

As shown in FIG. 1, the holographic recording and reproducing apparatus in the embodiment includes a laser oscillator 10 using, for example, Nd:YVO$_4$ crystal. Laser light at a wavelength of 532 nanometers that is coherent light is generated from the laser oscillator 10, and emitted. On a laser light emission side of the laser oscillator 10, a polarized beam splitter 16 is arranged, which transmits P polarized light and reflects S polarized light, and which thereby divides the laser light beam to two light beams, i.e., a light beam for a reference light beam and a light beam for a signal light beam.

On a light reflection side of the polarized beam splitter 16, a reflection mirror 18 and an objective lens 20 are sequentially arranged. The reflection mirror 18 reflects the laser light beam for the reference light beam and changes a direction of an optical path to a holographic recording medium. The objective lens 20 condenses the laser light beam for the reference light beam and generates the reference light beam including a spherical reference wave. On a laser light condensing side of this objective lens 20, an x-z stage 22 is provided. The x-z stage 22 includes a stepping motor that rotates a holographic recording medium 24 formed into a disk shape in a z plane. The objective lens 20 irradiates the S polarized light beam that is a spherical reference wave onto the holographic recording medium 24 as a reference light beam.

On a light transmission side of the polarized beam splitter 16, a shutter 12 which shields the P polarized light beam transmitted through the polarized beam splitter 16, and a polarization rotator 26 which rotates a polarization plane by 90 degrees are disposed so that the shutter 12 and the polarization rotator 26 can be individually inserted into and retracted from the optical path. On a light transmission side of the polarization rotator 26, a lens system is disposed, which includes a reflection mirror 28 and lenses 30, 32, and 34 disposed in this order, which reflects the laser light beam for the signal light beam at a reflection angle of 45°, and which changes the direction of the optical path to the holographic recording medium. A spatial light modulator 36 of a transmission type is disposed between the lenses 32 and 34. The spatial light modulator 36 includes a liquid crystal display element and the like, modulates the laser light beam for the signal light beam according to a supplied recording signal for each page, and generates the signal light beam for recording each page of holograms.

The lenses 30 and 32 collimate the laser beam to a large-diameter beam, and irradiate the beam onto the spatial light modulator 36. The lens 34 condenses the P polarized light beam that is modulated and transmitted by the spatial light modulator 36, on the holographic recording medium 24 as the signal light beam. At this moment, the P polarized light beam is condensed so that a signal light condensed spot is smaller than a reference light condensed spot, and the signal light beam and the reference light beam are simultaneously irradiated onto the holographic recording medium 24. Since the P polarized light beam is the signal light beam and the S polarized light beam is the reference light beam, a polarization direction of the signal light beam is orthogonal to a polarization direction of the reference light beam when each page of holograms is recorded. Alternatively, an S polarized light beam may be the signal light beam and a P polarized light beam may be the reference light beam. The signal light beam and the reference light beam having polarization planes parallel to each other may be used. Circularly polarized light beam rotating in different directions may be used as the signal light beam and the reference light beam, respectively.

A lens 38, an analyzer 44 which selects a light beam in a predetermined polarization direction (e.g., a light beam having a 0°polarized component, a 45° polarized component, or a 90° polarized component) from reproduced light beams and which transmits the selected light beam, and a detector 40 which includes an imaging element such as a CCD, which converts the received reproduced light beam into an electric signal, and which outputs the electric signal, are arranged on a reproduced light transmission side of the holographic recording medium 24. The detector 40 is connected to a personal computer 42.

The personal computer 42 is connected to the spatial light modulator 36 through a pattern generator 46 which generates a pattern according to the recording signal supplied from the personal computer 42 at predetermined timing. A driving device 48 is connected to the personal computer 42. The driving device 48 drives the shutter 12 and the polarization rotator 26 to be inserted into the optical path individually, and drives the shutter 12 and the polarization rotator 26 to be individually retracted from the optical path. Further, a driving device 50 which drives the x-z stage 22 is connected to the personal computer 42.

Figure 2A:
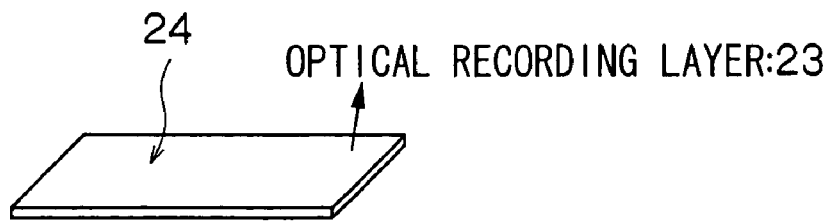
FIG. 2A is a schematic view which illustrates the configuration of a holographic recording medium.
Figure 2B:
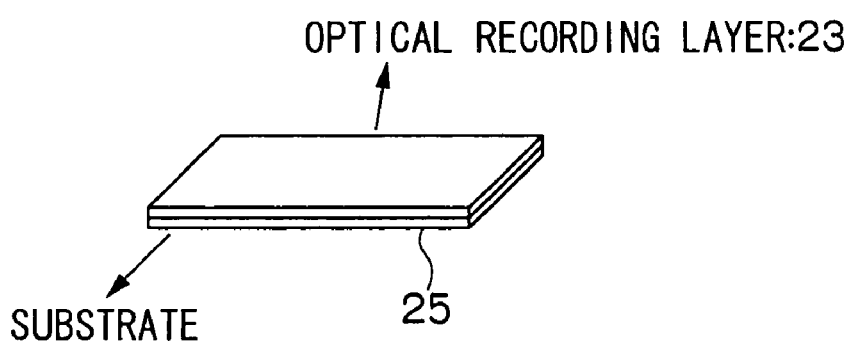
FIG. 2B is a schematic view which illustrates the configuration of the holographic recording medium.
Figure 2C:
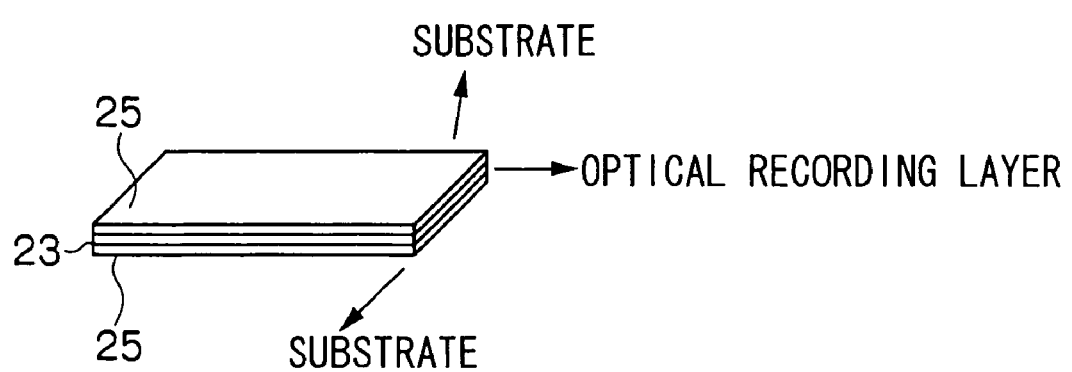
FIG. 2C is a schematic view which illustrates the configuration of the holographic recording medium.

FIGS. 2A, 2B, and 2C illustrate the configuration of the holographic recording medium (optical recording medium) 24. While the holographic recording medium 24 in this embodiment is formed into a disk shape, FIGS. 2A to 2C illustrate a rectangularly cut-out portion of the holographic recording medium 24. As shown in FIG. 2A, the holographic recording medium 24 includes an optical recording layer 23 molded in the form of a thick film to have a thickness of, for example, 100 μm or more. If sufficient strength cannot be secured only by an optical recording layer, a substrate 25 composed of a plate transparent medium such as quartz or plastic can be provided on one surface or both surfaces of the optical recording layer 23 as shown in FIG. 2B or FIG. 2C.

As a material for the optical recording layer 23, i.e., photosensitive layer, any material such as a photorefractive material or a polarization sensitive material can be used as long as the material exhibits photoinduced refractive index change or photoinduced dichroism and maintains the photoinduced refractive index change or the photoinduced dichroism at an ordinary temperature. Preferably, a material which is a polymer containing a photoisomerized group in a side chain, e.g., at least one type of polymer selected from polyesters and containing a photoisomerizing group in a side chain, such as a material having an azobenzene structure is used for the optical recording layer 23.

The principle of a photoinduced birefringence will be described, taking azobenzene as an example. The azobenzene repeats a trans-cis-trans isomerization cycle when being irradiated with light. Before light irradiation, many trans azobenzene molecules are present in the optical recording layer. These molecules are oriented at random and macroscopically isotropic. If linearly polarized light is irradiated, the azobenzene molecules, each having an absorption axis in the same direction as the polarization direction, are selectively trans-cis isomerized. The molecules relaxed into trans isomers each having the absorption axis orthogonal to the polarization direction do not absorb light any longer and are fixed to the state. As a result, macroscopically, anisotropy of an absorption coefficient and a refractive index, i.e., the dichroism and the birefringence are induced. The orientation of the polymer containing such photoisomerizing groups changes due to photoisomerization, so that a large birefringence can be induced. The birefringence thus induced is stable at a glass transition temperature or less, and suited to record each page of holograms.

Polyester containing cyanoazobenzene on each side chain and expressed by the following chemical formula (see Japanese Patent Application Laid-Open (JP-A) No. 10-340479) is a suitable material for recording holograms based on the above-stated mechanism. This polyester can record a polarization direction of the signal light as a hologram due to the photoinduced anisotropy resulting from the photoisomerization of the cyanoazobenzene contained in each side chain. Further, the polyester can record the holograms at a room temperature and retains the recorded holograms semipermanently.

Figure 4:
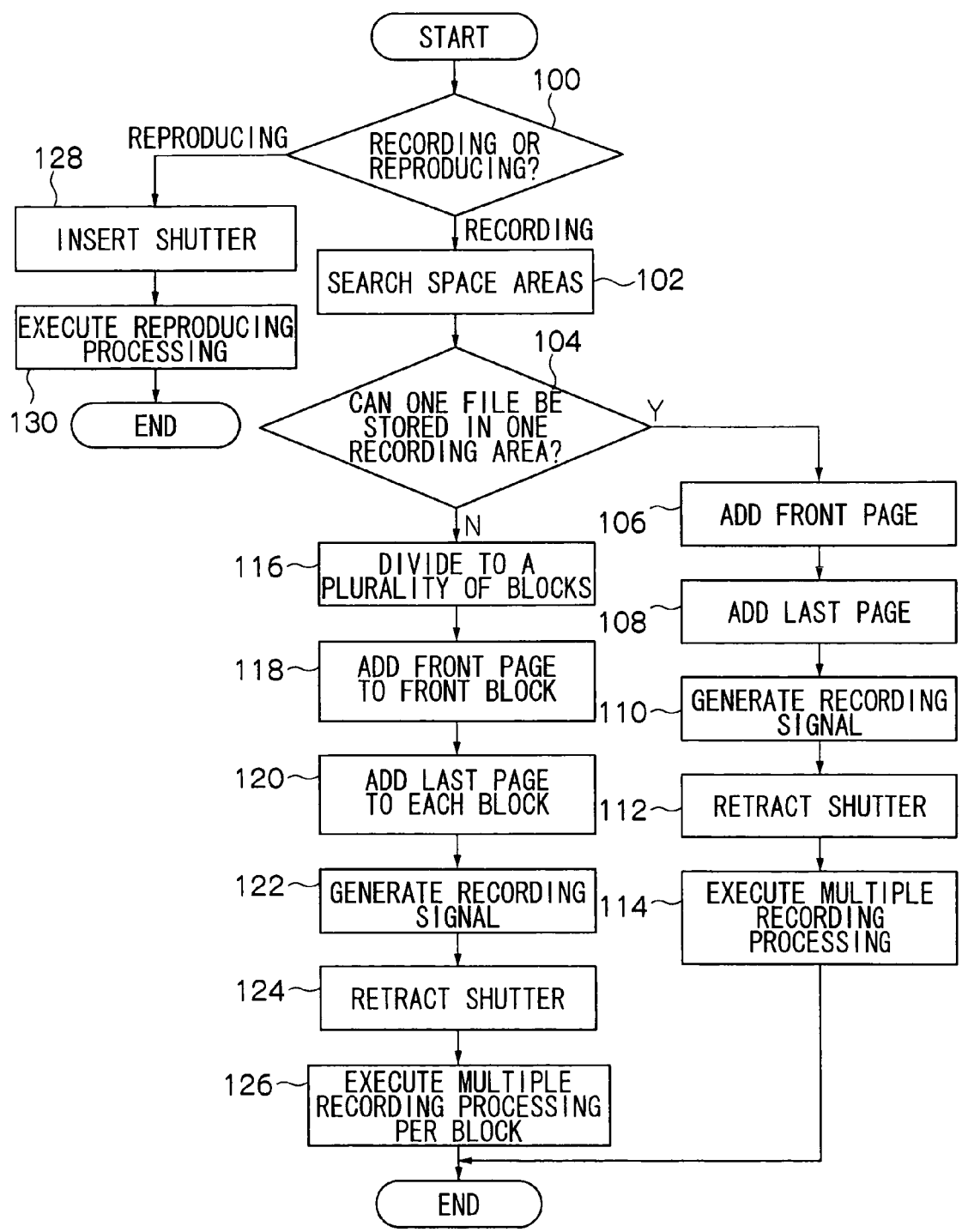
FIG. 4 is a flow chart which illustrates a holographic recording and reproducing processing routine in the embodiment of the present invention.

Next, referring to FIG. 4, a recording and reproducing processing routine executed by the personal computer 42 will be described. First, an operator operates an operation apparatus, not shown, to select a holographic recording processing for recording each page of holograms or a holographic reproducing processing. If the holographic recording processing is to be performed, a file including multiple page data is inputted to the personal computer 42 in advance.

In step 100, it is determined whether the holographic recording processing for recording each page of the holograms has been selected or the holographic reproducing processing has been selected. If the holographic recording processing is selected, space areas for recording are searched while referring to the FAT in step 102. In step 104, a capacity of the inputted file is compared with a capacity of each recording area, and it is determined whether the inputted file can be stored in a single recording area.

If the inputted file can be stored in a single recording area, page data that represents head information is added to a front page of the file in step 106. In step 108, page data that represents information that there is no information to be read next, is added to a last page of the file. During reproduction, the holograms are sequentially read from the front to last pages. By referring to the information on the last page, it is possible to determine that the reading of the file is completed. In step 110, a recording signal is generated for each of all pages of the file including the front page and the last page.

In step 112, the driving device 48 is actuated to drive the shutter 12 to be retracted from the optical path so that the laser light can pass through the optical path. In addition, the

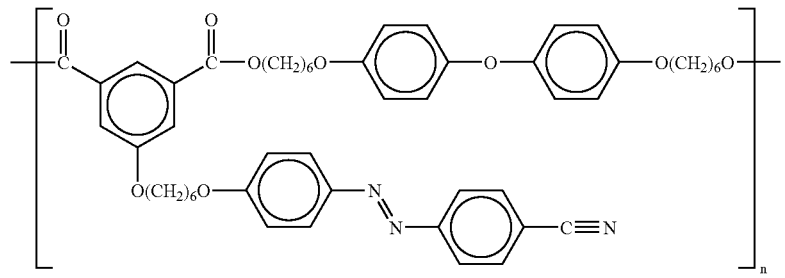

Figure 3:
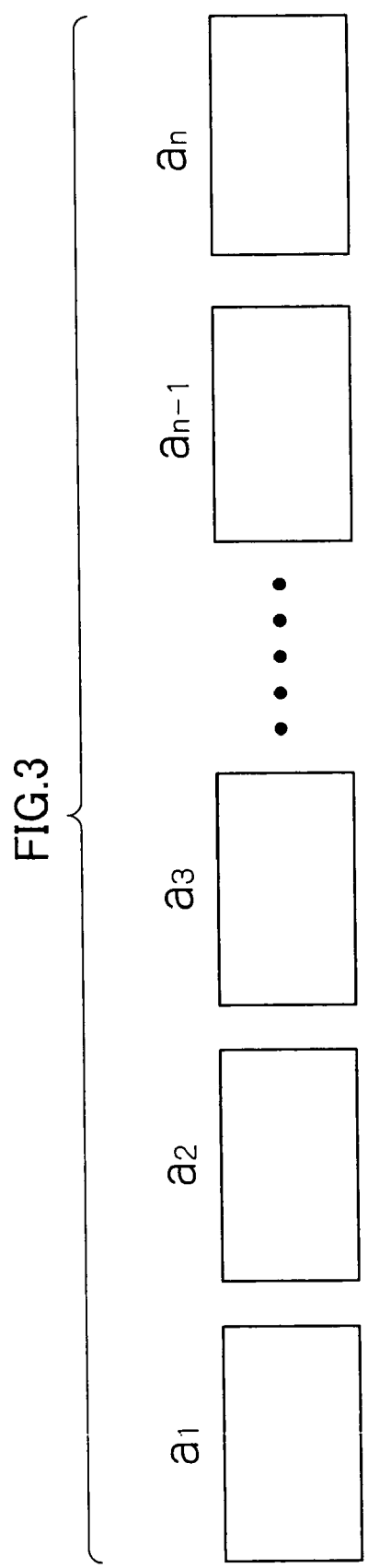
FIG. 3 is a schematic view which illustrates recording areas arranged on an optical recording layer of the holographic recording medium.

In the disk-shaped holographic recording medium 24, plural recording tracks are concentrically arranged on the optical recording layer 23. As shown in FIG. 3, each recording track is divided to many recording areas $a_1$ to $a_n$. The recording areas $a_1$ to $a_n$ are equal in capacity, and data recording or reproducing is performed in each of the divided recording areas.

Part of the many recording areas is used to record directory information such as a file name, an update date, a file size, and a recording area of each recorded data. In addition, part of the recording areas is used to record a file allocation table (hereinafter, "FAT") that shows each recorded file and the recording area in which this file is recorded while making them correspond to each other. Based on the directory information and allocation information obtained by referring to the FAT, usage of the recording areas can be grasped.

driving device 50 is actuated to drive the stepping motor of the x-z stage 22 to rotate the holographic recording medium 24 at a predetermined rotation speed. In step 114, the laser light is irradiated, and the recording signal for each page is outputted from the personal computer 42 at a predetermined timing relative to a recording start point, and whereby a shift multiplexing processing for a hologram is executed to the holographic recording medium 24.

Figure 5:
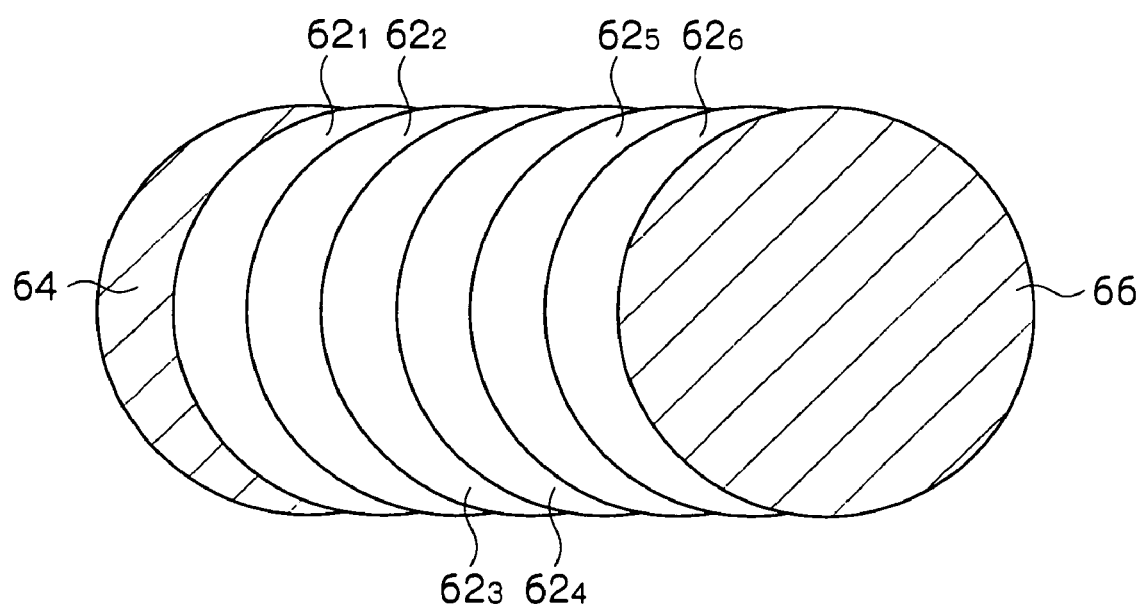
FIG. 5 is a view which illustrates a hologram recorded state of multiple recorded holograms.

Through the above-stated processing, plural pages of holograms are multiple-recorded per file. As shown in FIG. 5, if the file is recorded as six pages of holograms $62_1$ to $62_6$, a total of eight pages of holograms including a hologram of the front page 64 and a hologram of the last page 66 are multiple-recorded.

Figure 6A:
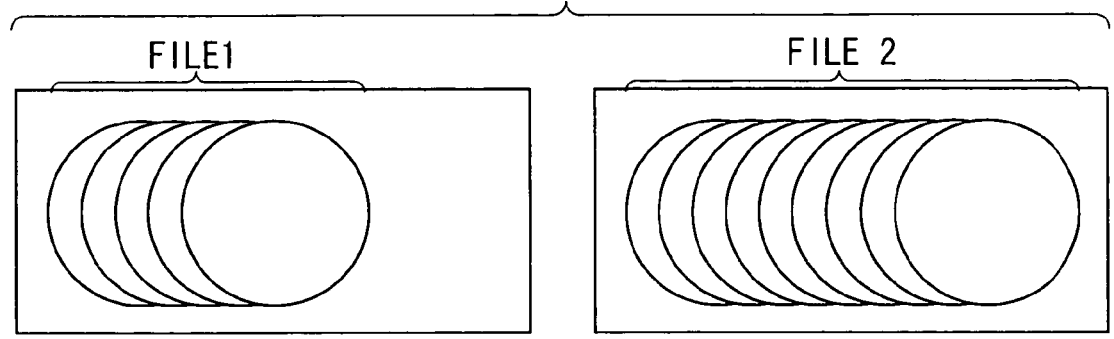
FIG. 6A is a view which illustrates a hologram recorded state if only a single file is stored in a single recording area.
Figure 6B:
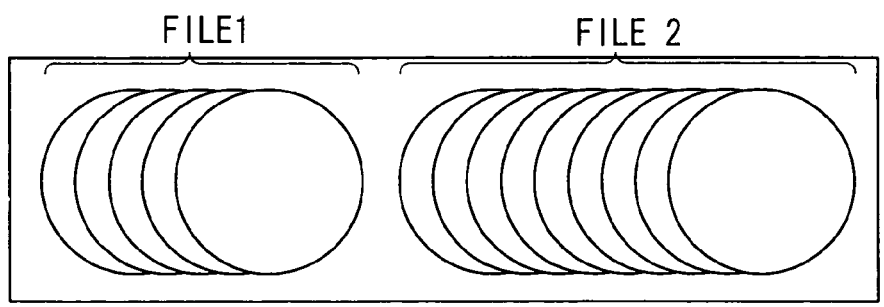
FIG. 6B is a view which illustrates a hologram recorded state if plural files are stored in a single recording area.

As shown in FIG. 6A, only a single file may be stored in the single recording area. As shown in FIG. 6B, plural files may be stored in a single recording area. In either case, holograms are multiple-recorded per file. Page data in one file is multiple-recorded, while page data in one file and page data in another file are not multiple-recorded. Therefore, it is possible to selectively rewrite or erase only a desired file without degrading the other files.

If plural files are stored in a single recording area, the other files are often already stored in the recording area before the inputted file is to be recorded. Therefore, in step 104, the capacity of the inputted file is compared with a remaining capacity of the single recording area (a capacity of unrecorded parts of the recording area), and it is determined whether the inputted file can be stored in the single recording area.

If it is determined in step 104 that the inputted file cannot be stored in the single recording area, the page data in the file is divided to plural blocks according to a space of the recording areas in step 116. At this moment, in order to prevent a reduction in file search speed, the file is divided so as to be able to use the recording areas located at positions at which seek time is short.

Figure 7:
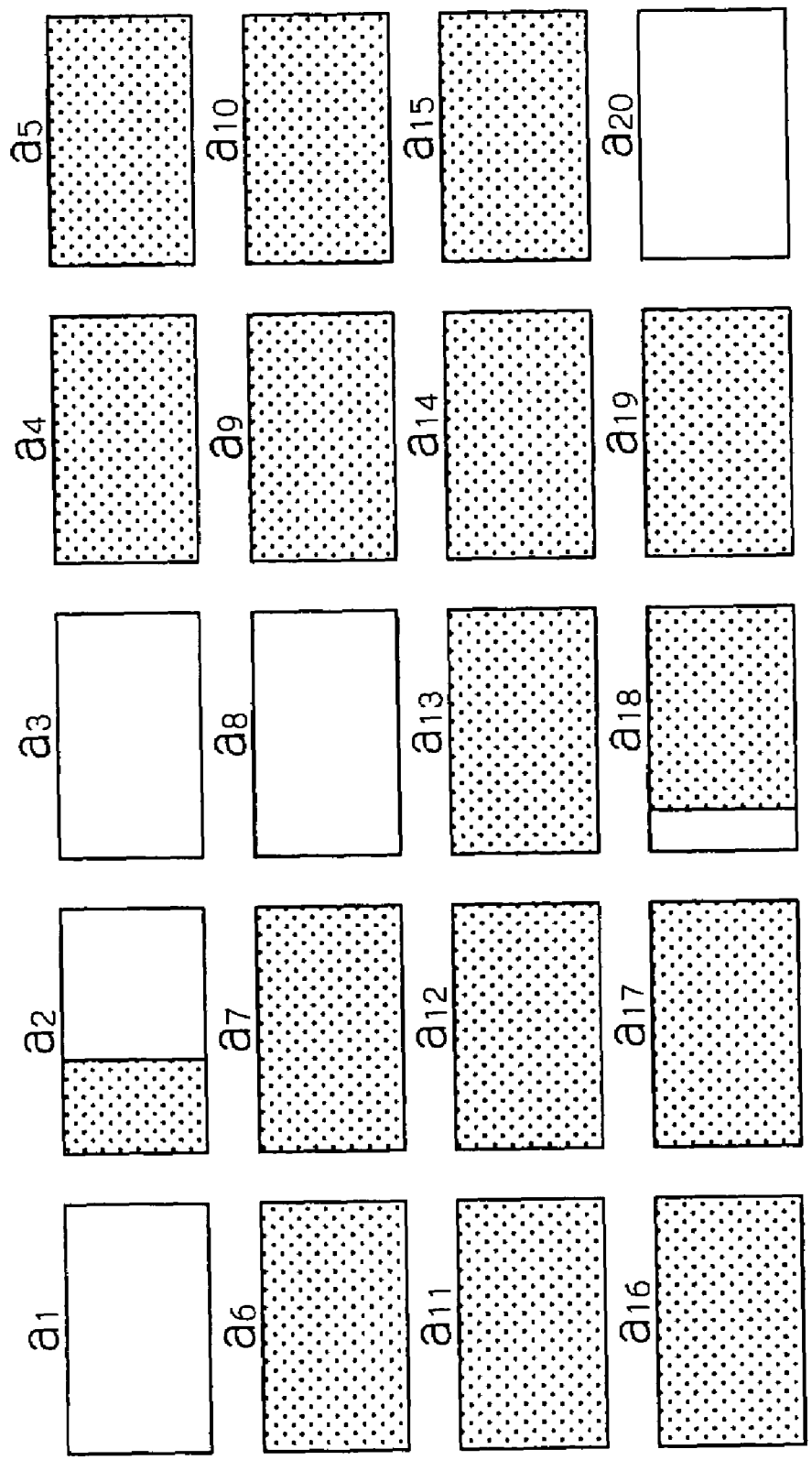
FIG. 7 is a conceptual view which illustrates the recording area usage, in which space areas are present in a distributed manner.

As shown in FIG. 7, for example, an instance will be described, in which twenty recording areas $a_1$ to $a_{20}$ are sequentially arranged on the optical recording layer 23 and in which space areas are distributed in a scattered manner. In FIG. 7, a white portion corresponds to a space area and a gray portion corresponds to a data-recorded area. In this instance, each recording area has a recording capacity of six pages of holograms, the recording area $a_2$ has a remaining capacity of two pages of holograms, and the recording area $a_{18}$ has a remaining capacity of one page of hologram.

Figure 8:
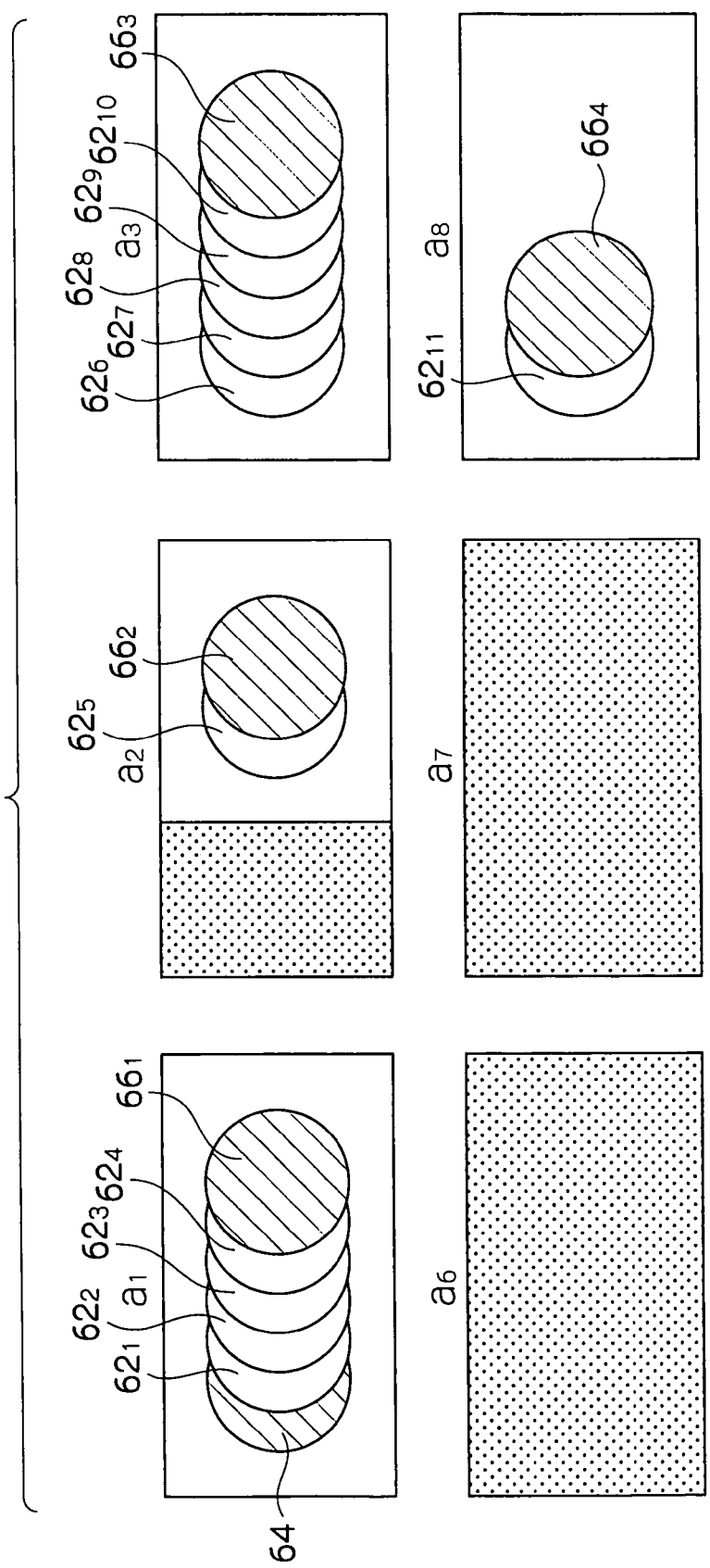
FIG. 8 is a conceptual view which illustrates a state in which one file is divided to plural blocks and recorded.

Under these situations of recording area usage, a file constructed by page data corresponding to eleven pages of holograms is to be recorded. It is necessary to consider the added pages to be described later. Therefore, as shown in FIG. 8, the recording areas $a_1$, $a_2$, $a_3$, and $a_4$ are used, and the file is divided to four blocks such that four pages of holograms are recorded in the recording area $a_1$, one page is recorded in the recording area $a_2$, five pages are recorded in the recording area $a_3$, and one page is recorded in the recording area $a_8$. Namely, the file turns into a so-called fragmentation. In this instance, plural files are stored in a single recording area.

Next, in step 118, the page data that represents the head information is added to a front page of the first block. In step 120, the page data that represents a recording area in which a block to be read next is recorded is added to the last page of each block. It is noted, however, to the last page of the last block, the page data that represents the information that no block to be read next is present is added. In step 122, a recording signal is generated for each of all the pages of the blocks including the first and last pages.

At the time of reproduction, holograms from the front page to the last page of the first block are sequentially read. Next, referring to the information on the last page of the first block, the second block next to the first block is read. Likewise, the last page of the second block is referred to, and whereby continuous blocks are sequentially read. By referring to the last page of the last block, it is possible to determine that the reading of the file is completed.

In step 124, the holographic recording medium 24 is rotated similarly to step 122. In step 126, the laser light is irradiated, and the recording signal for each page is outputted from the personal computer 42 at the predetermined timing relative to the recording start position, and the shift multiplexing processing is executed to the holographic recording medium 24 per divided block.

Through the above-stated processing, plural pages of holograms are multiple-recorded per divided block. As shown in FIG. 8, for example, four pages of holograms $62_1$ to $62_4$ that constitute the first block, the hologram 64 for the front page, and the hologram $66_1$ for the last page of the first block, i.e., a total of six pages of holograms are multiplex-recorded in the recording area $a_1$. One page of a hologram $62_5$ that constitutes the second block and a hologram $66_2$ for the last page of the second block, i.e., a total of two pages of holograms are multiple-recorded in the recording area $a_2$. These holograms are not multiplexed with the page data in the other files that are already recorded in the recording area $a_2$.

Further, five pages of holograms $62_6$ to $62_{10}$ that constitute the third block and a hologram $66_3$ for the last page of the third block, i.e., a total of six pages of holograms are multiple-recorded in the recording area $a_3$. One page of a holograms $62_{11}$ that constitutes the fourth block and a hologram $66_4$ for the last page of the fourth block, i.e., a total of two pages of holograms are multiple-recorded in the recording area $a_8$.

In any recording area, the holograms are multiplexed and recorded per divided block. While page data in one file is multiple-recorded, page data in one file and page data in another file are not multiple-recorded. Therefore, only the desired file can be selectively rewritten or erased without degrading the other files.

In the shift multiplexing method in this embodiment, a spherical wave is used as the reference light, the holographic recording material is disk-shaped, and the disk-shaped holographic recording medium (disk) is rotated, thereby performing the shift multiplexing recording. With this shift multiplexing recording method, plural pages of holograms can be multiple-recorded in one area by rotating the disk. If a wavelength of the laser light, a film thickness of the recording medium, an NA of the objective lens, and the like are appropriately set, the next page of the hologram can be recorded in and reproduced from substantially the same area of the disk without cross-talk with the pages that are already recorded in the disk, only by rotating the disk so that a recording position at which the hologram of the next page is recorded is shifted by several tens of micrometers. This is based on the fact that because the reference light is the spherical wave, the shift of the disk-shaped holographic recording medium (by several tens of micrometers) is equivalent to the change of the angle of the reference light.

A distance that determines a shift amount of the disk-shaped holographic recording medium for shift multiplexing method using the spherical reference light, i.e., distance $\delta_{spherical}$, by which each hologram can be independently separated, is expressed by the following Equation (1).

$$\delta_{spherical} = \delta_{Bragg} + \delta_{NA} \approx \frac{\lambda z_0}{L \tan \theta_s} + \frac{\lambda}{2(NA)} \quad (1)$$

In Equation (1), $\lambda$ denotes the wavelength of the laser light, $z_0$ denotes a distance between the objective lens that generates the spherical reference wave and the holographic recording medium, L denotes the film thickness of the holographic recording medium, NA denotes a numerical aperture of the objective lens, and $\theta_s$ denotes an angle between the signal light and the reference light. Equation (1) demonstrates as follows. As the thickness L of the holographic recording medium is larger, the shift amount δ determined according to the distance by which each hologram can be independently separated is smaller. Accordingly, the number of multiplexed holograms can be increased and a recording capacity can be increased.

The personal computer 42 supplies the recording signal for each page to the spatial light modulator 36 at the timing determined so that each page of a hologram can be recorded by the shift amount δ from the recording start position while the holographic recording medium 24 is being rotated.

In this embodiment, similarly to the ordinary digital holographic storage, the signal light is Fourier-transformed by the lens and irradiated onto the holographic recording medium 24 serving as the recording medium. By using the lens, a relatively high optical intensity can be obtained on the surface of the holographic recording medium 24. In this case, if the distance between the Fourier-transform lens and the holographic recording medium is set equal to a focal length of the lens, Fourier-transformed holograms are recorded. Normally, the recording medium is slightly shifted from the focal position of the lens, and holographic recording is performed with a view of suppressing an intensity of zero-order diffracted light of the signal light on the recording surface.

Figure 9:
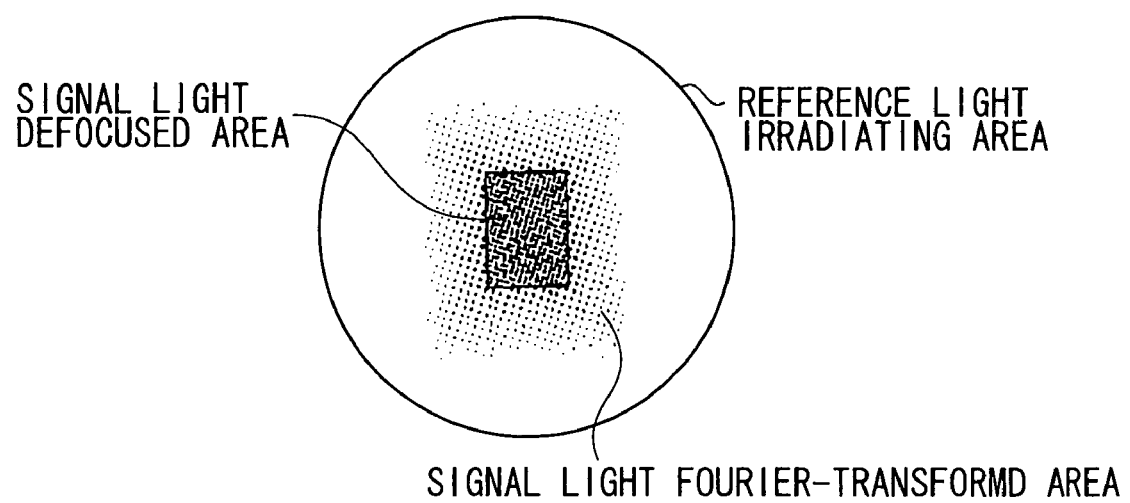
FIG. 9 is a schematic view which illustrates a relationship between a signal light irradiating area and a reference light irradiating area.

FIG. 9 typically illustrates a state in which holographic recording is performed at a defocused position. On the surface of the holographic recording medium, the signal light is condensed by the lens to some extent, and a diffraction pattern of the data pages appears. This diffraction pattern corresponds to a pattern (periodicity) of the digital data pages. The diffraction pattern has a widest spread when the digital data pages are in a random pattern.

On the other hand, the reference light is irradiated onto a wider region than the region onto which the signal light is irradiated to form the diffraction pattern, so as to cover the entire diffraction pattern of the signal light. At a portion where constructive interference occurs between the signal light and the reference light, a change in refractive index or absorption occurs. At a portion where destructive interference occurs between the signal light and the reference light, the change is little. Using this phenomenon, each page of a hologram is recorded.

Next, the holographic reproducing processing will be described. If it is determined in step 100 shown in FIG. 4 that the holographic reproducing processing has been selected, the shutter 12 is inserted into the optical path in step 128. As a result, the reproduction processing is performed in step 130. Namely, since the laser light transmitted through the polarized beam splitter 16 is shielded by the shutter 12, only the reference light is irradiated onto the holographic recording medium 24 on which holograms are previously recorded. Reproduction light diffracted by the holographic recording medium 24 is transmitted through the lens 38. Only the reproduction light having a predetermined polarization component is selected and transmitted by the analyzer 44. The reproduction light received by the detector 40 is converted into an electric signal by the detector 40, inputted to the personal computer 42, and displayed on a display (not shown) which is connected to the personal computer 42.

After the reproducing processing, the same data as that of all the pages of the reproduced file (including the front and last pages) may be overwritten (the same holograms may be re-recorded). The same holograms maybe overwritten in the same recording area as that in which the reproduced holograms are previously recorded, or overwritten in a new recording area. Although the recorded holograms are degraded by the irradiation of the reference light during reproduction, the data degradation is prevented by overwriting the holograms whenever a reproducing processing is performed.

If one file is divided to plural blocks and the blocks are recorded, it is preferable to execute defragmentation during wait time or the like. Since the page data that represents the recording area in which the block to be read next is recorded is added to each block, the file can be read even in a fragmentation. However, a moving amount of the head or the recording medium increases during the reproduction, and the file search speed is decreased. To prevent this, the defragmentation is executed to remove the fragmentation as much as possible.

Figure 10:
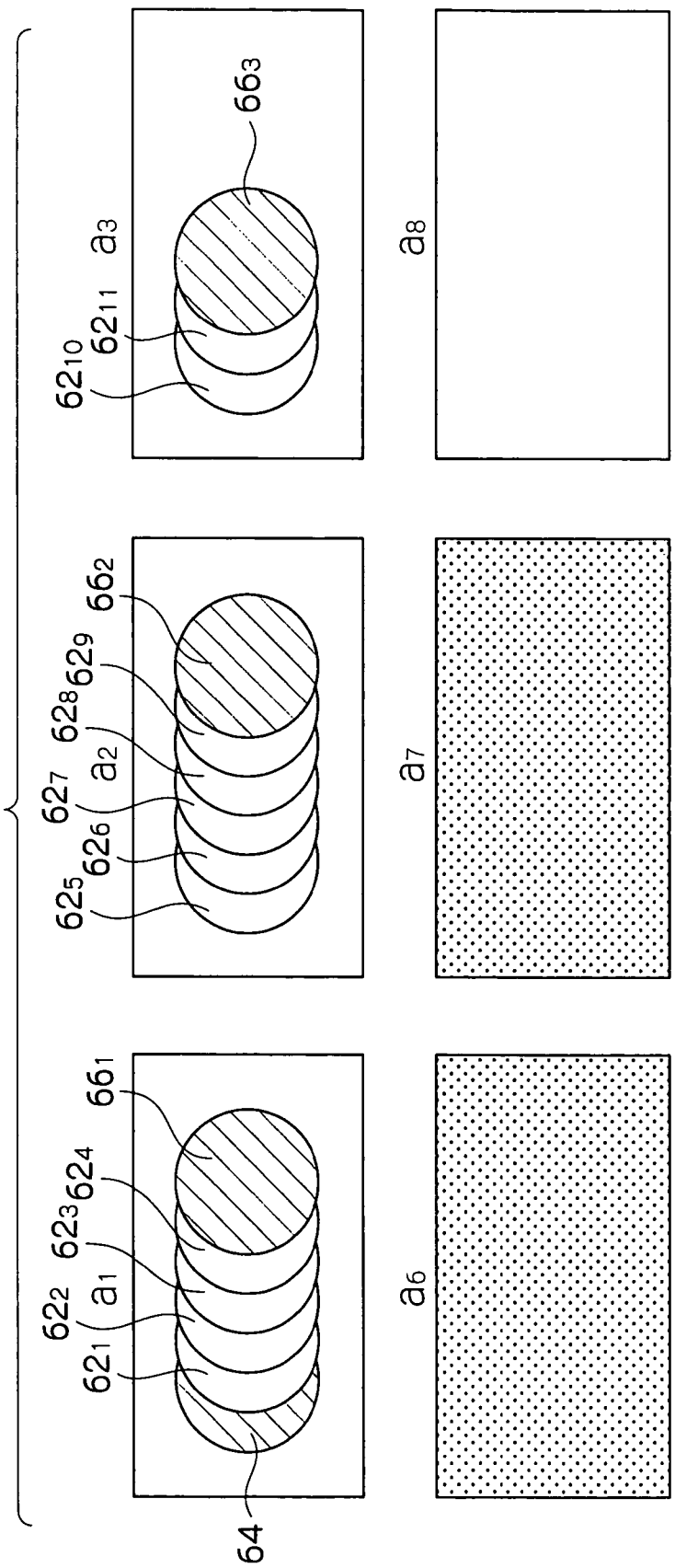
FIG. 10 is a conceptual view which illustrates a state in which files are reallocated after defragmentation.

As shown in FIG. 8, for example, if one file is previously recorded in the four recording areas $a_1$, $a_2$, $a_3$, and $a_8$ in a distributed manner, and thereafter the recording area usage changes such that the other files in the recording area $a_2$ are erased as shown in FIG. 10, the file is reallocated, accordingly. In this instance, by erasing the other files in the recording area $a_2$, the file constructed by the page data corresponding to eleven pages can be recorded using the continuous three recording areas $a_1$, $a_2$, and $a_3$ such that four pages of holograms are recorded in the recording area $a_1$, five pages are recorded in the recording area $a_2$, and two pages are recorded in the recording area $a_3$. Thus, the file can be recorded while dividing the file to three blocks, thereby eliminating the fragmentation.

In the embodiment, the instance of performing the shift multiplexing recording while rotating the holographic recording medium has been described. Alternatively, the shift multiplexing recording may be performed while linearly shifting the holographic recording medium. Instead of rotating or linearly shifting the holographic recording medium, the signal light and the reference light may be scanned on the holographic recording medium.

The embodiment of applying the holographic recording method of the invention to the shift multiplexing method has been described. The invention can be similarly applied to an angular multiplexing method, a wavelength multiplexing method, or a phase multiplexing method.

Figure 11:
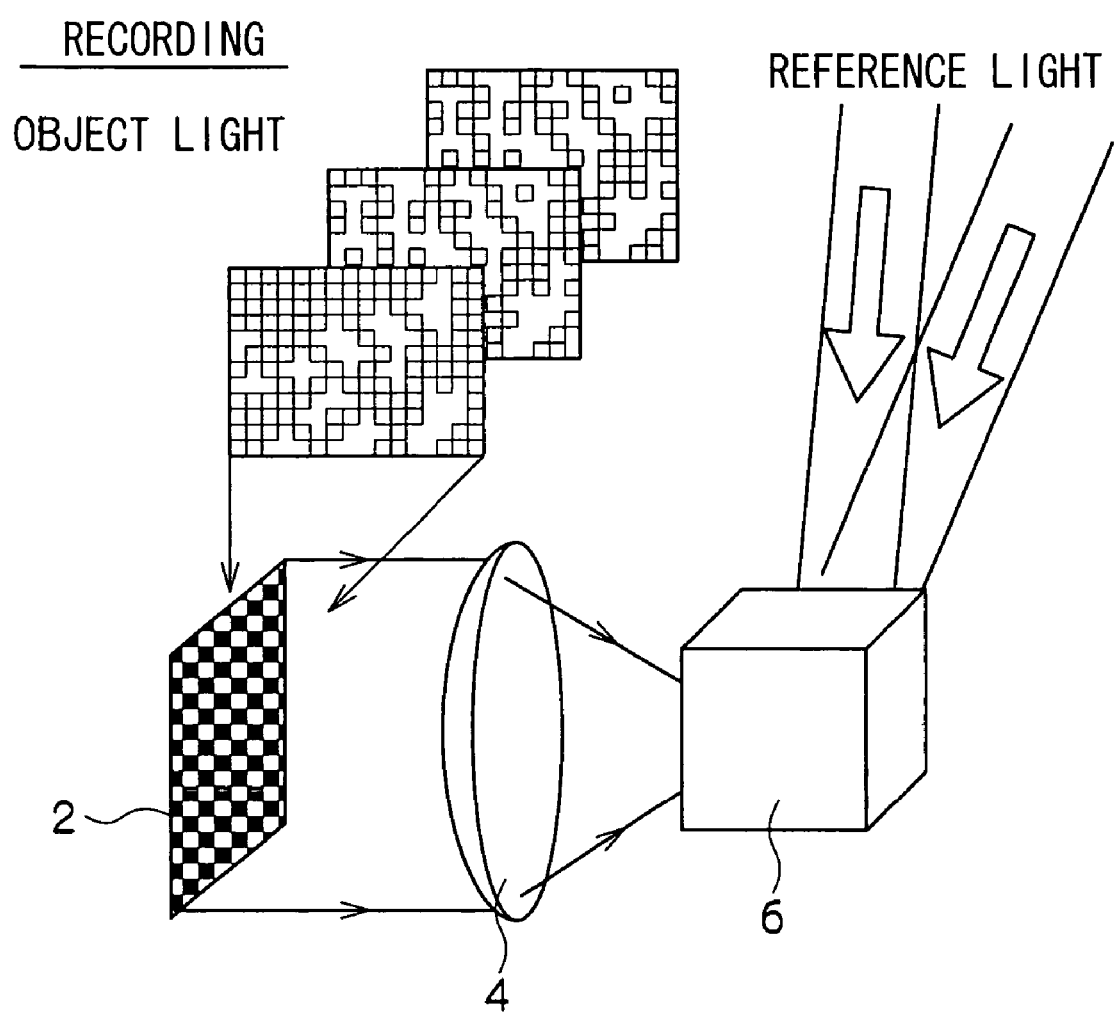
FIG. 11 is a view for describing an angular multiplexing method that is one of holographic multiple recording methods.
Figure 12A:
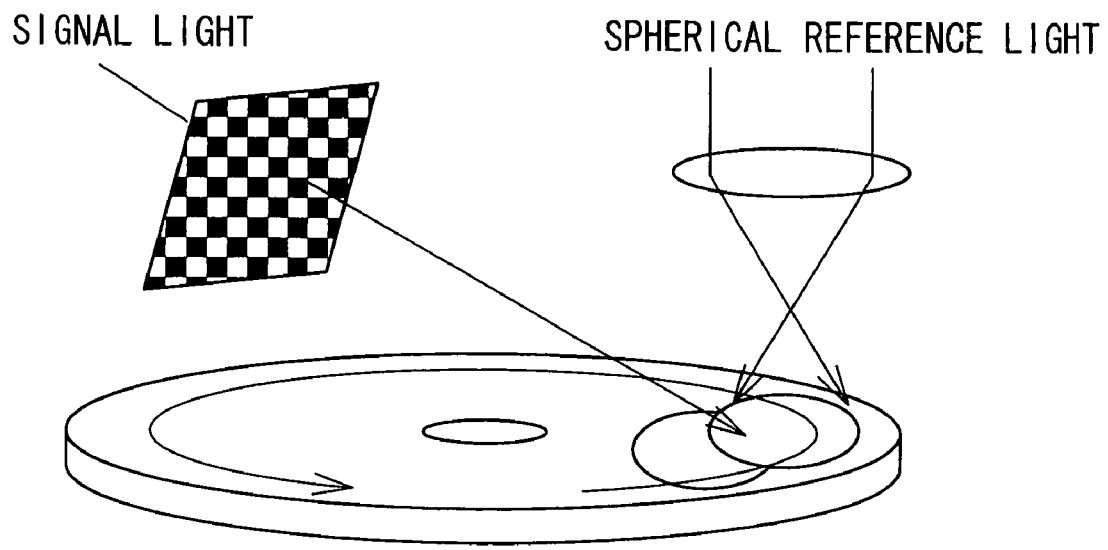
FIG. 12A is a view for describing a shift multiplexing method.
Figure 12B:
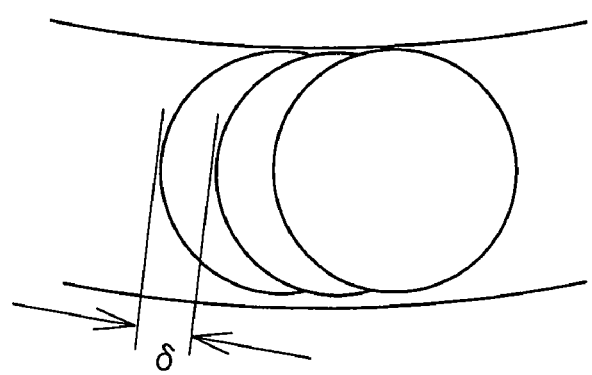
FIG. 12B is a view for describing the shift multiplexing method.

If the invention is applied to the angular multiplexing method, during holographic recording, the signal light and the reference light are simultaneously irradiated onto the optical recording medium while changing the angle of the reference light with respect to the signal light by a predetermined angle θ to thereby change the recording angle, and the information of the signal light is recorded on the holographic recording medium as plural pages of holograms as shown in FIG. 11. Instead of changing the angle of the reference light for multiple recording, multiple recording may be performed by changing the angle of the signal light with respect to the reference light.

If the invention is applied to the wavelength multiplexing method, during holographic recording, the angle between the signal light and the reference light is set constant, and the signal light and the reference light are simultaneously irradiated onto the optical recording medium while changing the wavelength of the signal light and that of the reference light by a predetermined wavelength Δλ, respectively, and the information of the signal light is recorded on the holographic recording medium as plural pages of holograms.

If the invention is applied to the phase multiplexing method, during holographic recording, the angle between the signal light and the reference light is set constant, the signal light and the reference light are simultaneously irradiated on the optical recording medium while changing a phase of the reference light, and the information of the signal light is recorded on the holographic recording medium as plural pages of holograms.

What is claimed is:

1. A holographic recording method for multiplexing at least two or more files, each of the files comprising one or a plurality of page data in an optical recording medium, as holograms, the method comprising:
   determining whether or not page data to be recorded constitute a same file;
   recording page data of separate files respectively in different positions in the optical recording medium, with the page data of separate files not multiplexed; and
   performing recording control with respect to page data of the same file such that the page data of the same file can be multiplexed.

2. A holographic recording method according to claim 1, wherein the page data is multiplexed for each predetermined unit, and the page data in the predetermined unit is page data that constitutes one file.

3. A holographic recording method according to claim 2, wherein information is recorded in the optical recording medium, the information making the file correspond to a recording area, in which the file is recorded.

4. A holographic recording method according to claim 2, wherein the page data that represents head information is added to a front page of the file.

5. A holographic recording method according to claim 1, wherein if the page data included in a file is divided to a plurality of blocks and the plurality of blocks are recorded, the page data that constitutes one block of the plurality of blocks is multiplexed.

6. A holographic recording method according to claim 5, wherein information is recorded in the optical recording medium, the information making the file correspond to a recording area, in which the file is recorded.

7. A holographic recording method according to claim 5, wherein page data that represents head information is added to a front page of the file.

8. A holographic recording method according to claim 5, wherein page data that represents information on a recording area in which the block to be read next is recorded, is added to an end of each block if the file is divided to a plurality of blocks and the plurality of blocks are recorded.

9. A holographic recording method according to claim 5, wherein if the file is divided to a plurality of blocks and the plurality of blocks are recorded, the file is reallocated so that the file is re-divided to a smaller number of blocks.

10. A holographic recording method according to claim 1, wherein a polarization direction of a signal light beam is set parallel to a polarization direction of a reference light beam.

11. A holographic recording method according to claim 1, wherein a polarization direction of a signal light beam is set different from a polarization direction of a reference light beam.

12. A holographic recording method according to claim 1, wherein a polarization direction of a signal light beam is set orthogonal to a polarization direction of a reference light beam.

13. A holographic recording method according to claim 1, wherein the optical recording medium includes a photorefractive material.

14. A holographic recording method according to claim 1, wherein the optical recording medium includes a polarization sensitive material.

15. A holographic recording method according to claim 1, wherein the optical recording medium includes at least one type of polyester polymer.

16. A holographic recording method according to claim 15, wherein the at least one type of polymer includes an azobenzene structure in a side chain.

17. A holographic recording method according to claim 1, wherein the multiplexing uses any one of shift multiplexing, phase multiplexing, angular multiplexing, and wavelength multiplexing.

18. A holographic recording apparatus for multiplexing at least two or more files, each of the files including one or a plurality of page data in an optical recording medium, as holograms, the apparatus comprising:
   a light source for emitting a coherent light beam;
   a stage that rotates or shifts an optical recording medium;
   a light dividing and optical path changing unit that divides the coherent light beam to a light beam for a reference light beam and a light beam for a signal light beam, and that changes an optical path so that the reference light beam and the signal light beam are simultaneously irradiated onto the optical recording medium;
   a spatial light modulator that is arranged in the optical path of the light beam for the signal light beam, that modulates the light beam for the signal light beam in accordance with a supplied recording signal for each page, and that generates the signal light beam for recording said each page of a hologram; and
   a signal supply unit that determines whether or not page data to be recorded constitutes a same file, that supplies the recording signal for said each page to the spatial light modulator so that page data of separate files are recorded in respectively different positions in the optical recording medium, with the page data of separate files not multiplexed, and that performs recording control with respect to page data of the same file such that the page data of the same file can be multiplexed.

19. A holographic recording apparatus according to claim 18, further comprising:
   an analyzer that transmits a component, in a predetermined polarization direction, of a diffracted light beam from said each page of the hologram recorded in the optical recording medium; and
   a detector that detects intensities of transmitted light beams that are transmitted through the analyzer.

20. A holographic recording apparatus for multiplexing at least two or more files, each of the files comprising one or a plurality of page data in an optical recording medium, as at least two holograms,
   wherein it is determined whether or not page data to be recorded constitute a same file,
   page data of separate files are not multiplexed, and are recorded respectively in different positions in the optical recording medium, and
   recording control is performed with respect to page data of the same file such that the page data can be multiplexed.

21. A holographic recording apparatus according to claim 20, wherein the multiplexing uses any one of shift multiplexing, phase multiplexing, angular multiplexing, and wavelength multiplexing.

22. A holographic recording apparatus according to claim 20, further comprising:
   an analyzer that transmits a component, in a predetermined polarization direction, of a diffracted light beam from each of the pages of the holograms recorded in the optical recording medium; and
   a detector that detects intensities of transmitted light beams that are 0transmitted through the analyzer.

* * * * *